(12) United States Patent
Yu et al.

(10) Patent No.: US 8,912,246 B2
(45) Date of Patent: Dec. 16, 2014

(54) CROSSLINKABLE CURING SUPER-BRANCHED POLYESTER AND CURED PRODUCT AND PREPARATION METHOD THEREOF

(75) Inventors: Mingdong Yu, Shanghai (CN); Zhi Chen, Shanghai (CN)

(73) Assignee: Shanghai Weikai Optoelectronics New Materials Co., Ltd., Shanghai (CN)

( * ) Notice: Subject to any disclaimer, the term of this patent is extended or adjusted under 35 U.S.C. 154(b) by 0 days.

(21) Appl. No.: 13/885,399

(22) PCT Filed: Nov. 15, 2010

(86) PCT No.: PCT/CN2010/078739
§ 371 (c)(1),
(2), (4) Date: May 16, 2013

(87) PCT Pub. No.: WO2012/065294
PCT Pub. Date: May 24, 2012

(65) Prior Publication Data
US 2013/0237627 A1    Sep. 12, 2013

(51) Int. Cl.
| | | |
|---|---|---|
| *C08G 61/04* | (2006.01) | |
| *C08G 63/06* | (2006.01) | |
| *C08G 83/00* | (2006.01) | |
| *C08G 63/664* | (2006.01) | |
| *C08G 63/91* | (2006.01) | |

(52) U.S. Cl.
CPC .............. *C08G 63/664* (2013.01); *C08G 63/06* (2013.01); *C08G 83/005* (2013.01); *C08G 63/912* (2013.01)
USPC ............ 522/33; 520/1; 522/6; 522/1; 522/71; 522/189; 522/184

(58) Field of Classification Search
CPC .. C08G 63/664; C08G 63/06; C08G 83/0005; C08G 63/912
USPC ................... 522/33, 6, 1, 71, 189, 184; 520/1
See application file for complete search history.

(56) References Cited

U.S. PATENT DOCUMENTS

2011/0045199 A1    2/2011    Cong

FOREIGN PATENT DOCUMENTS

| CN | 1248586 A | 3/2000 |
|---|---|---|
| TW | I265937 B | 11/2006 |
| WO | 00/64975 | * 11/2000 |

OTHER PUBLICATIONS

Kou, Huiguang et al, Recording performance of holographic diffraction gratings in dry films containing hyperbranched polyisophthalesters as polymeric binders, Jul. 1, 2003, Applied Optics, vol. 42, No. 19, 3944-3949.*

Huiguang Kou, Anlla Asif, Wenfang Shi, "Photopolymerizable acrylated hyperbranched polyisophthalesters used for photorefractive materials I. Synthesis and characterization," European Polymer Journal, 2002, 30, 1931-1936.

Huiguang Kou, Wenfang Shi, Lin Tang, and Hai Ming, "Recording performance of holographic diffraction gratings in dry films containing hyperbranched polyisophthalesters as polymeric binders," Applied Optics, 2003, vol. 42, No. 19, 3944-3949.

Wei Wei, Zhang Yan, Wei Jie, "Synthesis and Characterization of Pentaerythritol—Based Hyperbranched Polyester," Paint & Coatings Industry, 2008, vol. 38, No. 8, 19-22.

Tang Liming, You Hu, Li Yi, "Synthesis and curing of acrylate terminated hyperbranched polyester," J Tsinghua Univ (Sci & Tech), 2003, vol. 43, No. 12, 1613-1615.

ISR, WO, Jul. 28, 2011.
ISR Eng. version, WO, Jul. 28, 2011.
IPRP, WO, Feb. 4, 2013.

* cited by examiner

*Primary Examiner* — Ling Choi
*Assistant Examiner* — Jessica E Whiteley
(74) *Attorney, Agent, or Firm* — Kam W. Law; Squire Patton Boggs (US) LLP

(57) ABSTRACT

A crosslinkable curing super-branched polyester and the cured product and the preparation method thereof are disclosed. The super-branched polyester has high refractive index and comprises a compound represented by the following structural formula (I). In the formula (I), HBP is the backbone of the super-branched polyester; both a and b are positive integers; the sum of a and b is less than or equal to n; n is more than or equal to 10 and less than 80. In the super-branched polyester, A is represented by formula (II) and N is represented by formula (III), wherein R is methyl or hydrogen atom; the mole ratio of N relative to the total mole of A and N is more than 30 mol %, and the ratio of the total mole of A and N relative to the product of the total mole of HBP backbone and n is more than 0.5 and less than or equal to 1.

21 Claims, 1 Drawing Sheet

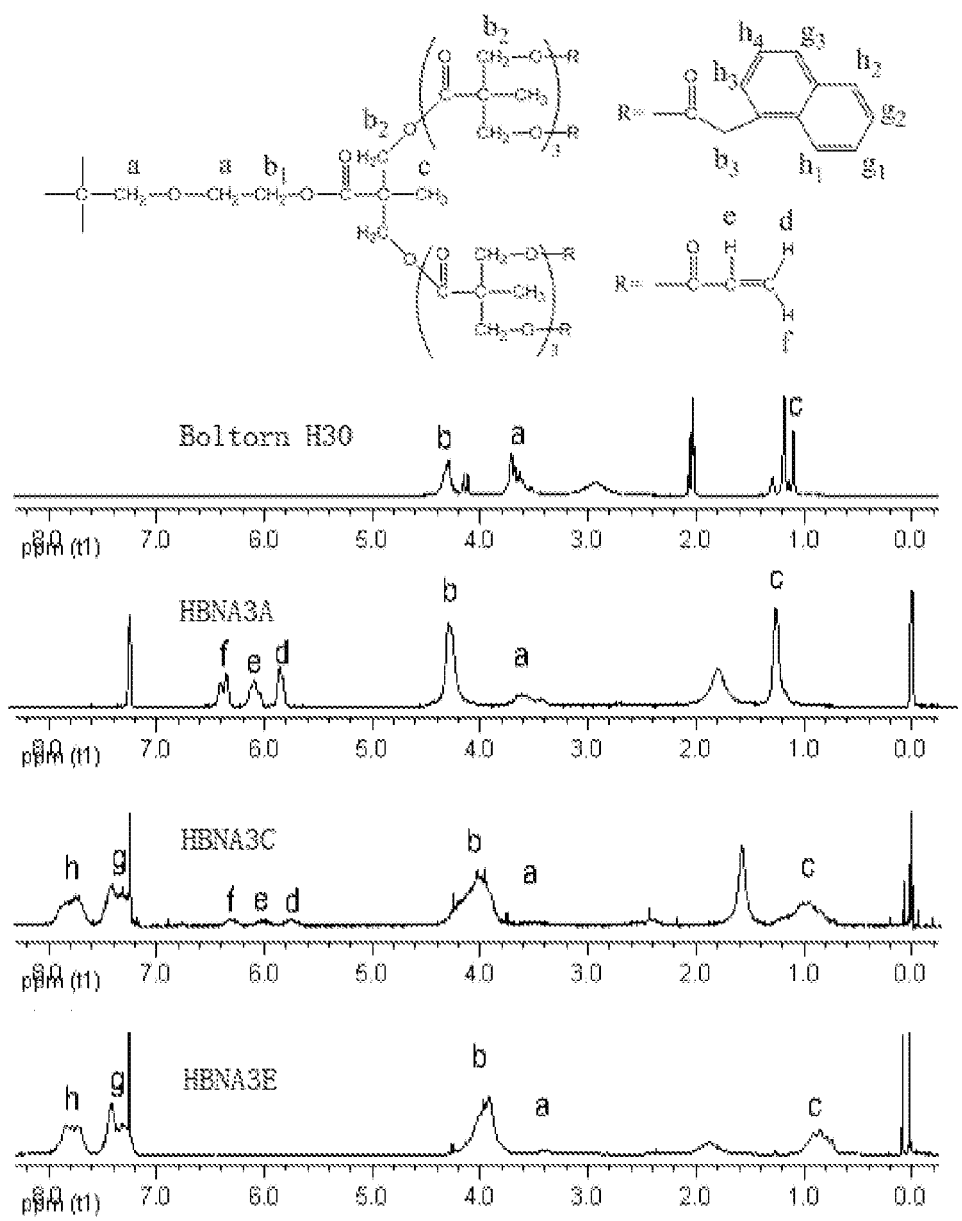

CROSSLINKABLE CURING SUPER-BRANCHED POLYESTER AND CURED PRODUCT AND PREPARATION METHOD THEREOF

FIELD OF THE INVENTION

The present invention relates to a crosslinkable curing super-branched (i.e., "hyperbranched") polyester, particularly a super-branched polyester which is capable of being cured by crosslinking through free radical polymerization initiated by light or heat, and to the cured product and the preparation method thereof.

BACKGROUND OF THE INVENTION

Organic materials with a high refractive index have been increasingly used in the fields of resin lens, optical devices, optical film, information storage, etc. Photocuring is a highly efficient approach to obtaining optical coating and optical adhesive layer. Highly refractive materials with photocuring functionality have exhibited a robust tendency for development, and shown increasingly significant application values in many fields, including backlight-brightness-enhancing films of LCD, LED encapsulations, protective coatings of panels of instrument and digital devices, etc. With a continuous growth of application demands, curable systems with a relatively high refractive index have been reported successively by some patent documents in the recent years. A Chinese patent application, CN1777822A, provides a single-phase, essentially solvent-free, polymerizable liquid composition comprising a polymerizable liquid and dissolved therein an organo-group 4, 5 or 6 compound, wherein the composition is polymerizable under the action of an externally applied influence. A Chinese patent for invention, granted under No. CN100355795C, provides a curable composition comprising multifunctional (meth)acrylate, substituted or unsubstituted aryl ether (meth)acrylate monomer, and polymerization initiator. The composition exhibits a high refractive index, and can be polymerized to provide a film with superior performance. US 2008/0075959A1 discloses a kind of photocuring monomers with high refractive index based on bromo-substituted fluorenyl, used for fabricating optical protective film. U.S. Pat. No. 7,491,441 reports an aromatic thio acrylate, such as diacrylate based on 4,4'-thiobisbenzenethiol or naphthalenedithiol; this curable compound has a relatively high refractive index and can be used for the durable hard coatings of display panels. U.S. Pat. No. 6,656,990 provides a curable organic-inorganic hybrid composition composed of metal oxide nanoparticles and organic components with high refractive index, and the compound can be used for making telecommunication optical waveguides.

However, the prior products mentioned above still cannot meet current demands. At present, there is still a need for curable monomers easy to prepare and cure and its cured products with controlled refractive index, so as to meet such requirements as protection and brightness enhancement for surface protective layer of LED devices, camera lens, and panels.

PUBLICATION OF THE INVENTION

SUMMARY OF THE INVENTION

In order to solve the above-mentioned technical problems, the present invention provides a super-branched polyester which is capable of being cured by crosslinking through free radical polymerization initiated by light or heat, and as a curable resin, is obtained by the modification of common hydroxyl-terminated super-branched polyesters. Specifically, (meth)acrylate groups are introduced to the terminal groups of the super-branched polyester as the backbone so as to impart the curable property to the resin; moreover, the inventor found out unexpectedly that by putting a proper amount of naphthalene rings into the terminal group of the same super-branched polyester, the refractive index of the cured products thereof can be controlled, thereby obtaining cured products with desirable refractive indexes.

Therefore, the present invention provides a crosslinkable curing super-branched polyester, which comprises a compound represented by Formula (I) as below:

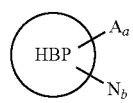

I

In the formula (I), HBP is the backbone of the super-branched polyester; both a and b are positive integers; the sum of a and b is less than or equal to n; n is greater than or equal to 10 but less than 80; A is represented by formula (II) as below:

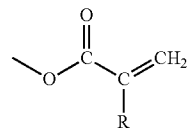

II

In formula (II), R is methyl or hydrogen;
N is represented by formula (III) as below:

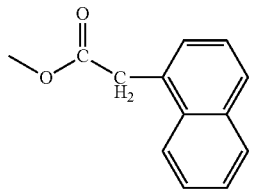

III

In the super-branched polyester, the mole ratio of N relative to the total moles of A and N is greater than or equal to 30% by mole, and the ratio of the total moles of A and N relative to the total moles of HBP multiplied by n is greater than or equal to 0.5 but less than or equal to 1.

The above-mentioned super-branched polyesters, per se with a high refractive index, are easy to prepare, and can be cured through simple curing reaction to obtain their cured products with a high refractive index, thus solving the above-mentioned problems in the prior art.

Meanwhile, the present invention also provides a method for preparing the crosslinkable curing super-branched polyester, wherein the super-branched polyester is obtained from the reaction of super-branched polyester backbone compound having n terminal hydroxyl groups with the following compounds: at least one compound selected from (meth)acrylic acid and (meth)acryloyl halide; and at least one compound selected from naphthylacetic acid and naphthylacetyl halide.

The above-mentioned method can be used to prepare the super-branched polyester as represented by the formula (I), wherein the reaction is simple and controllable and the raw materials are easily available, characterized by prominent convenience.

In addition, the present invention also provides a crosslinkable curing super-branched polyester composition, wherein the composition comprises the crosslinkable curing super-branched polyester and a photoinitiator.

The composition can be used to prepare the cured products according to the present invention, which have a high refractive index and therefore, can be used as coatings applied to surface layers of, for example, LED devices, camera lens and panels to protect and enhance brightness of the coated products.

In addition, the present invention also provides cured products produced by curing reaction of the above-mentioned compositions.

The cured products as obtained have a high refractive index, and therefore, can be used as the surface protective layers of, say, LED devices, camera lens, panels, etc., so as to protect the coated products and enhance the brightness thereof.

Moreover, the present invention uses saturated aliphatic super-branched polyester as the backbone, and introduces naphthalene rings and acrylate double-bond to the terminal groups, obtaining a kind of curable super-branched polymers with relatively high refractive index. As these super-branched polymers have a special dendritic molecular structure and saturated polyester backbone, they possess a very good compatibility with common photocuring monomers and prepolymers, and are also very suitable for being copolymerizing components or blending components for improving refractive indexes of polymers.

DESCRIPTION OF THE DRAWINGS

FIG. 1 shows the $^1$H NMR spectra of an unmodified super-branched polyester, Boltorn H30, a super-branched polyester, HBNA3A, esterified with acrylate only, a super-branched polyester, HBNA3E, esterified with naphthylacetic acid only, and a super-branched polyester (represented by HBNA3C) containing both acrylate-based curable groups and naphthylacetic-acid-ester groups.

DETAILED DESCRIPTION OF EMBODIMENTS

The backbone compounds used by the crosslinkable curing super-branched polyesters according to the present invention, namely the super-branched polyesters, are a kind of typical super-branched polymers, and also a kind of new materials varied in type and with wide applications which have been developed during the development of super-branched polymers. Generally speaking, branched repeat units of ordinary super-branched polyesters have ester groups as their characteristic groups, and have such typical characteristics as highly branched structure, spherical molecular shape, a large amount of terminal groups, etc. Due to its special molecular structure, plenty of active terminal groups and good comprehensive performance, the super-branched polyesters have an extensive research value and application prospect. However, any of super-branched polyesters can be used as the backbone compounds in the present invention for reacting with, for example, acrylic acid and naphthylacetic acid to obtain the crosslinkable curing super-branched polyester of Formula (I), as long as the polyesters have n hydroxyls.

The super-branched polyester backbone compounds applicable to the present invention can be prepared by using many synthetic methods, such as self-condensing polymerization of ABx-type monomers (x>1), multi-branched ring-opening polymerization and multi-functional monomers copolymerization, etc. These methods have been well known in the art, and specifically described in "Hyperbranched Polyester" (published by Chinese Chemical Industry Press in 2009). In general, the skeletal materials of the crosslinkable curing super-branched polyester according to the present invention are available from a wide range of sources, whether commercially available or synthesized by oneself. Any of the super-branched polyester skeletal compounds can be used to prepare the crosslinkable curing super-branched polyester as represented by the formula (I), as long as they have n hydroxyl-terminated groups. But in order to acquire the cured products with controllable refractive index, n is preferably 10-80. In addition, the super-branched polyester backbone compounds used in the present invention are preferably aliphatic super-branched polyesters having n hydroxyl-terminated groups, and more preferably, saturated aliphatic super-branched polyesters having n hydroxyl-terminated groups, so as to increase the miscibility of the obtained products with other resins and polymerizing monomers, thus achieving smooth reaction and improving the compatibility of subsequent products.

As mentioned above, the aliphatic super-branched polyesters can be obtained by common synthetic methods, though for convenience, commercial aliphatic super-branched polyesters may also be used. The super-branched polyesters, such as Boltorn H20, Boltorn H30 and Boltorn H40 corresponding to Reproductive Generation Numbers 2, 3 and 4, respectively (produced by the Swedish company Perstorp AB), are preferably used as the commercial aliphatic super-branched polyesters in the present invention in order to obtain the super-branched polyesters with high refractive index and then further to obtain the cured products with high refractive index, wherein n is 16, 32 and 64, respectively, and their desirable structures are shown as follows:

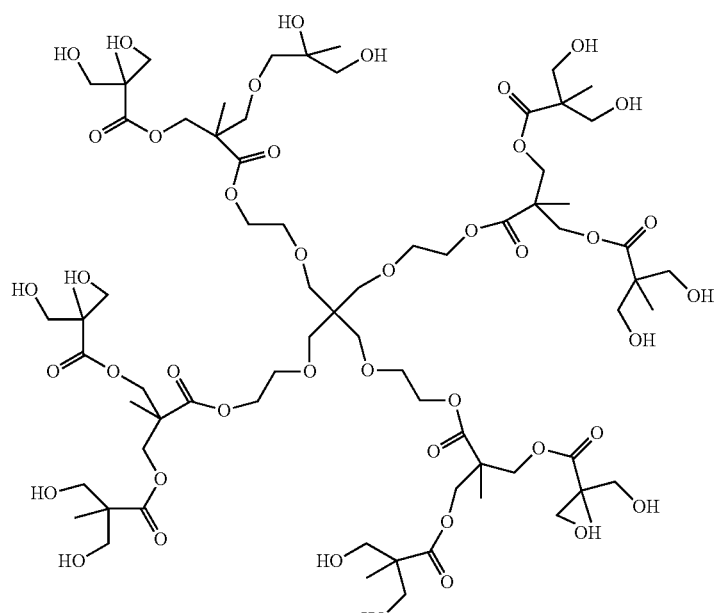
Boltorn H20
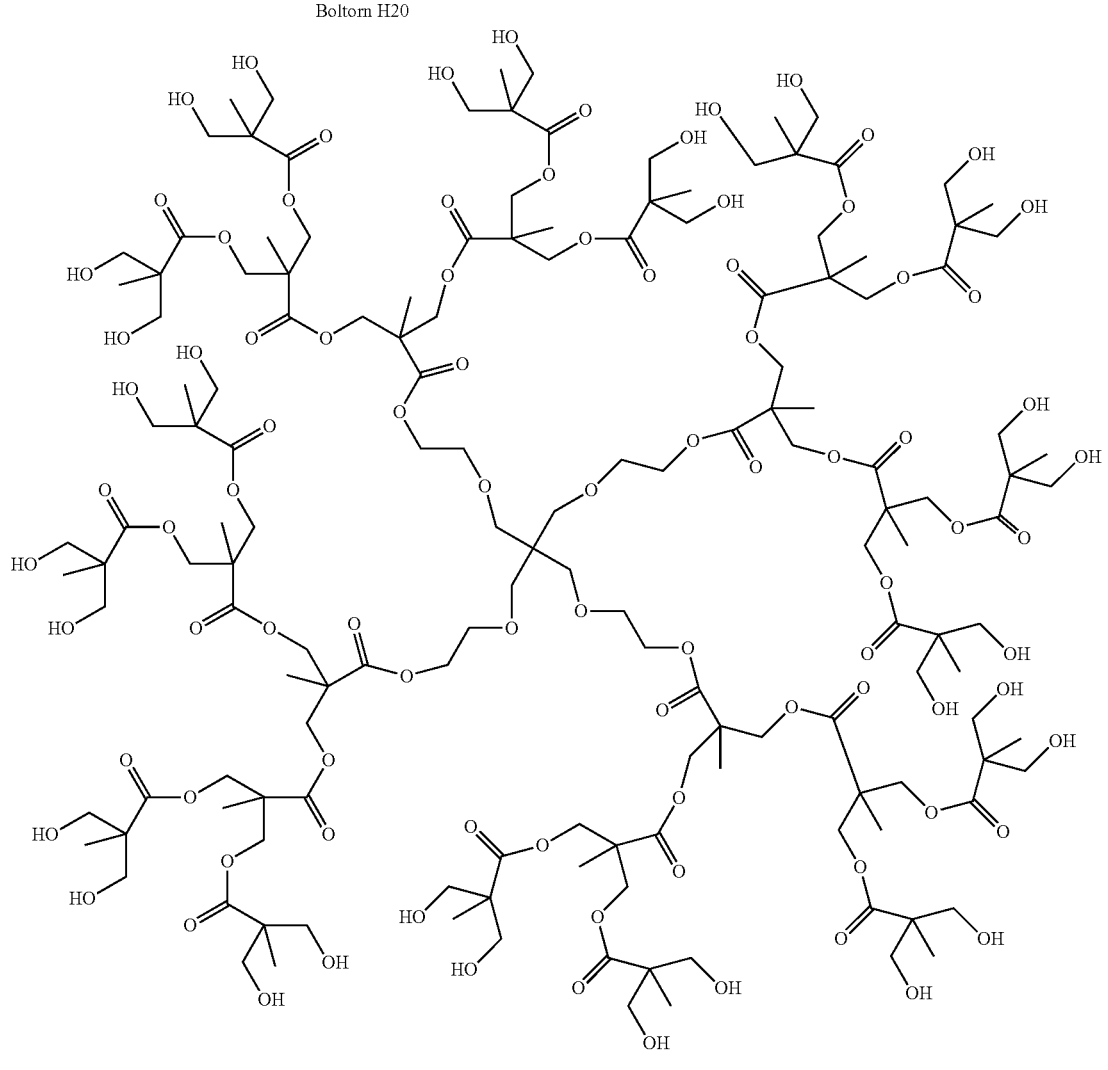
Boltorn H30

-continued

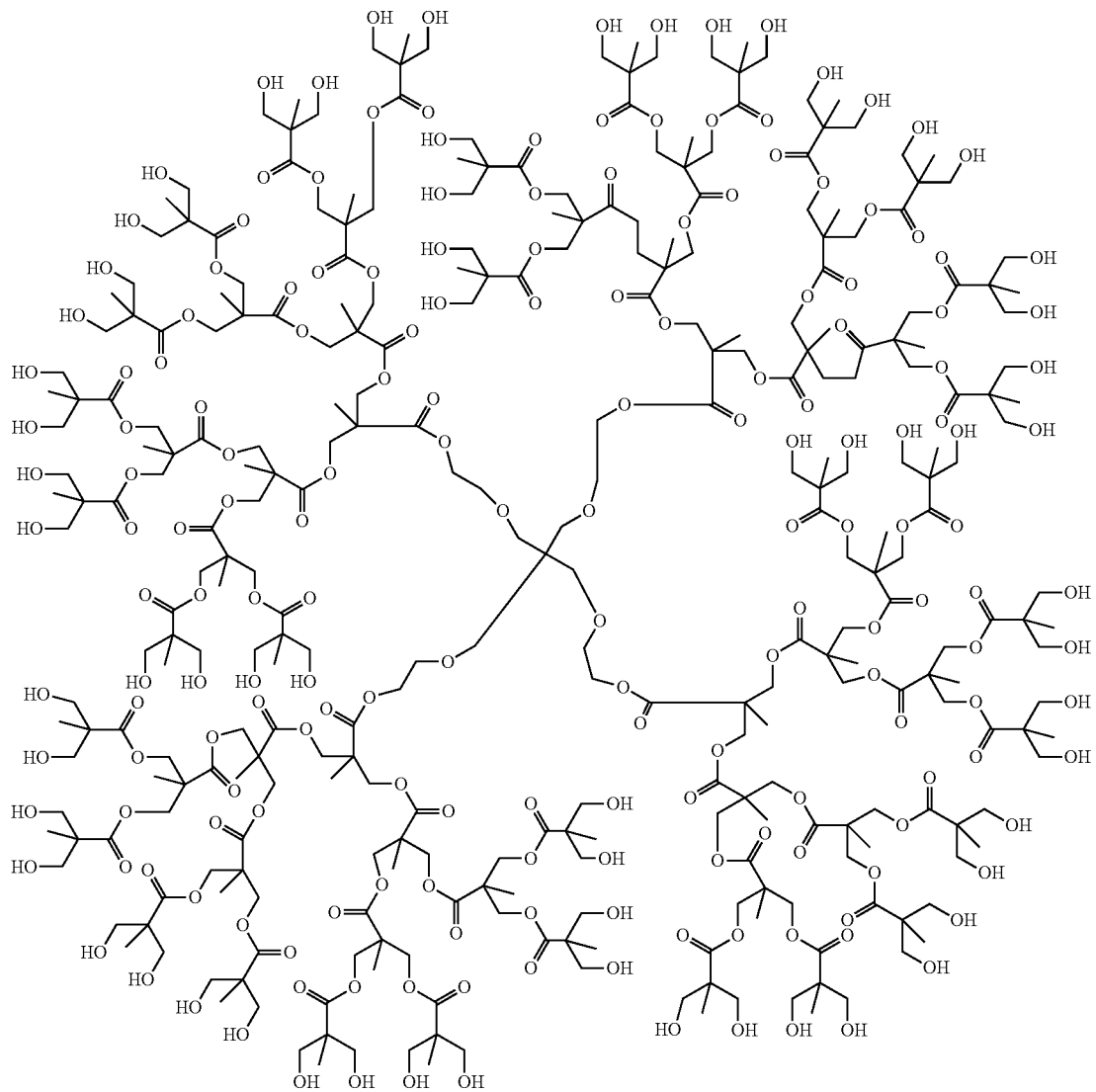

Boltorn H40

Despite this, the aliphatic super-branched polyesters suitable for the present invention are not limited to the compounds as exemplified above. Taught by the present invention, those skilled in the art might expect that any compound with a structure similar to those of the aliphatic super-branched polyesters mentioned above can be used as the backbone compound, such as those aliphatic super-branched polyesters derived from the parent compound (V) shown below, wherein n is 10-80, so as to obtain the crosslinkable curing macromonomer (I) with high refractive index as mentioned above.

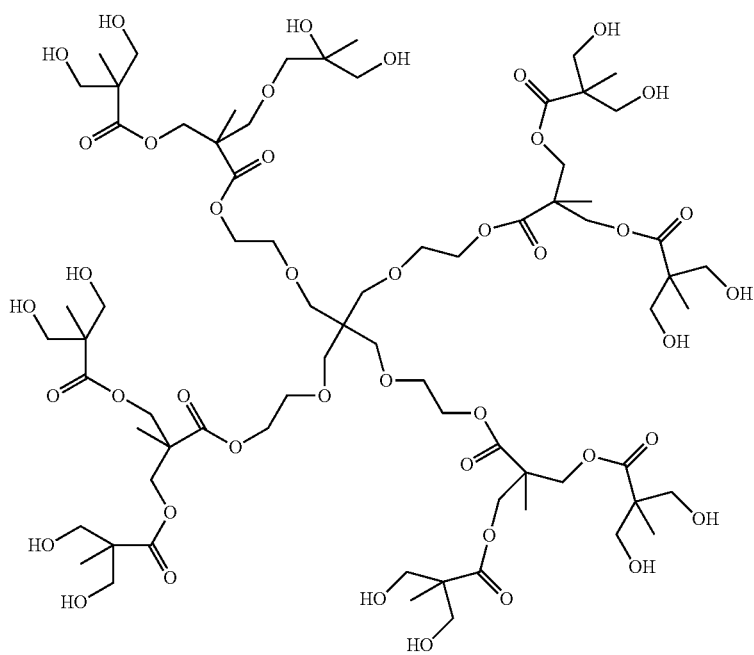

V

In order to obtain the backbone compounds suitable for the present invention, 2,2-dimethylolpropionic acid as a branching and chain-extending molecule can be used in consecutive chain-extending esterification reaction with the compound of the formula (V), so as to obtain the aliphatic super-branched polyester backbone compounds with more hydroxyl-terminated groups (n=10-80).

As mentioned above, in the formula (I), both a and b are positive integers, and the sum of a and b is less than or equal to n. Desirably, the sum of a and b should be equal to n, which can make the best use of the hydroxyl-terminated groups of the backbone compound. However, the present inventors found out that even under the condition of the sum of a and b less than n, such as greater than or equal to 0.6 n, the actual demand can be satisfied, that is, to obtain the curable monomers meeting the practical requirements, so as to further obtain the cured products with high refractive index.

What's important is that the ratio of the total moles of A and N relative to the total moles of HBP backbone multiplied by n is greater than or equal to 0.5, more preferably, greater than or equal to 0.6, and most preferably, greater than or equal to 0.7. In other words, when using, for example, acrylic acid and naphthylacetic acid as modifying compounds to react with the backbone compound with n hydroxyl terminated-groups, it should be ensured that the esterification rate is above or equal to 50%, more preferably above or equal to 60%, and most preferably, above or equal to 70%. In this way, the macromonomers with both crosslinkable curing ability and high refractive index can be obtained. On the other hand, in order to ensure that the monomers with high refractive index and then the cured products with high refractive index could be obtained, the mole ratio of N relative to the total moles of A and N should be above or equal to 30% by mole, and more preferably, above or equal to 40% by mole. In order to obtain curability, the ratio should be lower than 100% by mole % by mole (both a and b are positive integers). In order to balance the refractive index and the curability of the curable monomers, the range is further preferably from about 30% by mole to about 80% by mole, more preferably, about 40% by mole to about 75% by mole, and most preferably, about 60% by mole to about 75% by mole.

In the present invention, the grafting of (meth)acrylate ester groups to the terminal groups of the super-branched polyester backbone compound is achieved through the reaction of the hydroxyl-terminated groups of the backbone compound with the compound containing (meth)acryloyloxyl. The compound for introducing (meth)acryloyloxyl into the backbone can be (meth)acryloyl halide, in particular, (meth)acryloyl chloride. However, in consideration of the availability and cost, the compound is preferably acrylic acid or methacrylic acid.

In the invention, the grafting of naphthalene groups to the terminal groups of the super-branched polyester backbone compound is achieved through the reaction of the hydroxyl-terminated groups of the super-branched polyester backbone compound with the compound containing naphthyl. The compound used to introduce naphthyl into the backbone can also contain carboxyl(s) or acyl halide group(s) or other groups that can react with hydroxyl to form ester groups. Therefore, it can be naphthoic acid, naphthylacetic acid, naphthoyl chloride and naphthylacetyl chloride, wherein it is preferably naphthylacetic acid and naphthylacetyl chloride, and most preferably, naphthylacetic acid in view of the availability and cost.

The method for synthesizing the crosslinkable curing super-branched polyester with high refractive index according to the present invention can adopt common esterification reaction methods, that is, forming ester through reaction of hydroxyl-terminated groups with carboxyl or acyl halide. The typical reaction process is shown by the following scheme:

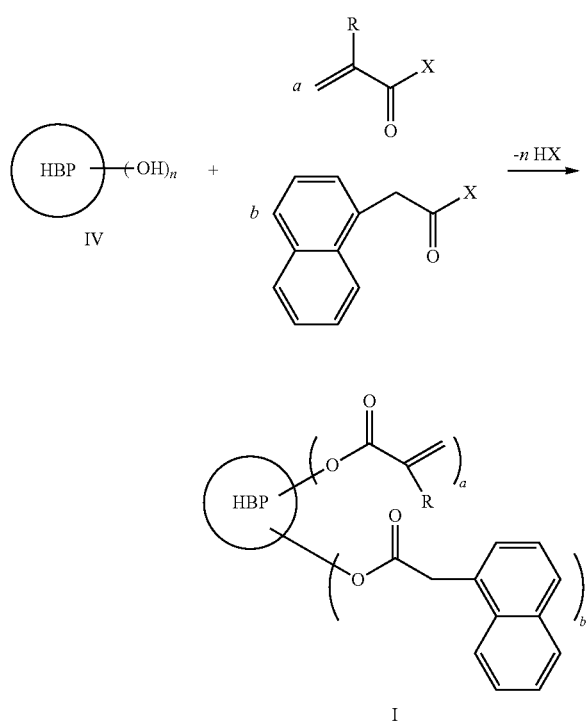

Formula (IV) is a super-branched polyester backbone compound containing hydroxyl-terminated groups. Formula (I) is the above-mentioned crosslinkable curing super-branched polyester, and X is hydroxyl or halogen atom; R is H or $CH_3$; a and b are the respective numbers of A group and N group in the formula (I), and the contents of the crosslinkable curing groups and naphthalene rings can be changed arbitrarily by adjustment, so as to control the crosslinking curing activity and the refractive index of the products. Apparently, the crosslinkable curing super-branched polyester produced according to the present invention is a mixture containing the super-branched polyester of the formula (I). And in the various super-branched polyesters represented by the formula (I), each molecule has independently its own a and b, wherein the sum of a and b is less than or equal to n. However, since the above-mentioned reaction is relatively thorough, the average molecule number of a is close to the mole ratio of the modifying compound containing (meth)acryloyloxyl (such as acrylic acid) relative to the backbone compound, and the average molecule number of b is also close to the mole ratio of the modifying compound containing naphthalene rings relative to the backbone compound. Therefore, both a and b can be adjusted by varying the additive amounts of the raw materials. The inventor found out that through adjustment of the additive amounts of the various modifying compounds, the contents of the crosslinkable curing groups and the naphthalene rings groups in the products can be changed arbitrarily, so that the crosslinking curing activities and the refractive indexes of the products can be controlled. As a result, the refractive indexes of the above-mentioned crosslinkable monomers can be adjusted to 1.50-1.60, while the refractive indexes of the cured products thereof can reach 1.55-1.65.

To achieve the above technical effects, a water-carrying agent can be used to propel the above-mentioned esterification reaction during the process of the reaction. The water-carrying agent may be any organic reagent which is capable of forming azeotropic mixture with water but is not soluble in water and does not participate in or interfere with the esterification reaction. The examples of the water-carrying agent include benzene, toluene, xylene, cyclohexane, halogenated alkanes (such as chloroform, carbon tetrachloride, etc.), acetonitrile, acrylonitrile, ether and carbon disulfide, etc. Wherein, to increase the conversion ratio, benzene, toluene, xylene, cyclohexane or halogenated alkanes (such as chloroform, carbon tetrachloride, etc.) may be used preferably, and more preferably, toluene may be used. The amount of water-carrying agent used can be determined according to the practical situation, and is not limited particularly, as long as it is able to make the esterification ratio above or equal to 50% (preferably, above or equal to 60%).

In addition, to inhibit possible free radical polymerization reaction during the process of the above esterification reaction, preferably, to the raw reactants may be added with a polymerization inhibitor which can inhibit free radical polymerization, such as hydroquinone (HQ), p-benzoquinone (PBQ), methyl hydroquinone (THQ), 4-methoxyphenol (MEHQ), 2-tertiary butyl hydroquinone (MTBHQ) and 2,5-di-tertiary butyl hydroquinone (2,5-DTBHQ), phenothiazine, β-phenyl naphthylamine, methylene blue, 1,1-diphenyl-2-trinitrobenzene hydrazine, 2,2,6,6-tetramethylpiperidine-1-oxyl free radical, etc. Wherein, for the convenience of separation to avoid impairing subsequent curing reaction, hydroquinone (HQ), p-benzoquinone (PBQ), methyl hydroquinone (THQ), 2-tertiary butyl hydroquinone (MTBHQ), 2,5-di-tertiary butyl hydroquinone (2,5-DTBHQ) and hydroquinone monomethyl ether (MEHQ) are preferable; 4-methoxyphenol (MEHQ) is more preferable. The amount of polymerization inhibitor can be determined according to the practical situation, and as a preferable range, the mole ratio of the inhibitor relative to the reactant containing double-bond may be 0.5-8.0% by mole. If the mole ratio is less than 0.5% by mole, the polymerization inhibitor may not achieve inhibiting effect, while if the mole ratio is higher than 8.0% by mole, the polymerization inhibitor can not be completely removed in the subsequent purification, thus not favorable for curing reaction. Based on the similar grounds, to achieve better effects, a more preferable range is 2.0-6.0% by mole.

On the other hand, to improve the efficiency of the above-mentioned esterification reaction, to the raw reactants may be preferably added with a catalyst, such as acid catalysts like concentrated sulphuric acid and p-methylbenzene sulfonic acid and basic catalysts like sodium hydroxide and 4-dimethylaminopyridine. Wherein, to avoid adversely affecting the refractive index of end product and in consideration of environmental protection, p-methylbenzene sulfonic acid may be preferably used as the catalyst. The amount of catalyst used can be determined according to the practical situation; the range may be preferably 1.0% by mole to 15.0% by mole, and more preferably, 3.0% by mole to 10.0% by mole, relative to the total moles of the modifying compounds (the modifying compound(s) containing acyloxy and the modifying compound(s) containing naphthyl).

The temperature for the above-mentioned esterification reaction is preferably higher than the azeotropy point of the azeotropic mixture of the water-carrying agent and water. For example, when toluene is used as the water-carrying agent, the temperature may be 110-130° C., and more preferably, 115-120° C. Within this range of reaction temperature, the reaction time may be preferably 4-12 hours, and more preferably, 5-10 hours. However, the actual reaction time should be based on the reaction endpoint indicated by the instrument. The detecting instrument used herein may be a common infrared detector, which can be used for detecting an endpoint wherein, for example, the hydroxyl absorption peak at 3408 $cm^{-1}$, stops changing.

In addition, in order to improve the esterification efficiency and prevent or inhibit free radical reaction, nitrogen gas may be preferably inlet as a protecting gas during the above esterification.

The methods for separating the curable monomers from the products of the above esterification reaction may include: use $NaHCO_3$ aqueous solution (preferably more than 10 wt. %), diluted hydrochloric acid and saturated salt water to wash the products in batches, so as to obtain the organic layer as remained; use a desiccant (such as anhydrous $MgSO_4$) to dry and dehydrate the organic layer; and then remove the solvent with reduced pressure, thus obtaining the curable monomers. Based on the above description, the method for preparing the crosslinkable curing super-branched polyester according to the present invention can be: reacting a super-branched polyester backbone compound having n hydroxyl-terminated groups with the following compounds: at least one compound selected from (meth)acrylic acid and (meth)acryloyl halide; and at least one compound selected from naphthylacetic acid and naphthylacetyl halide.

According to the above-mentioned preparation methods, the super-branched polyester backbone compound having n hydroxyl-terminated groups may be preferably an aliphatic super-branched polyester. Preferably, the aliphatic super-branched polyester may be one or more compound(s) selected from Boltorn H20, Boltorn H30 and Boltorn H40; or contain one or more compound(s) selected from the following compounds:

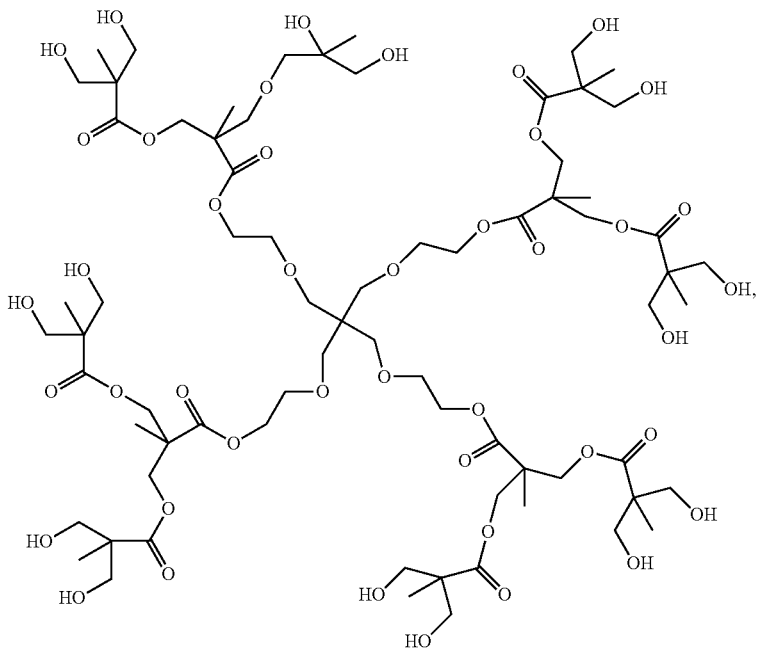

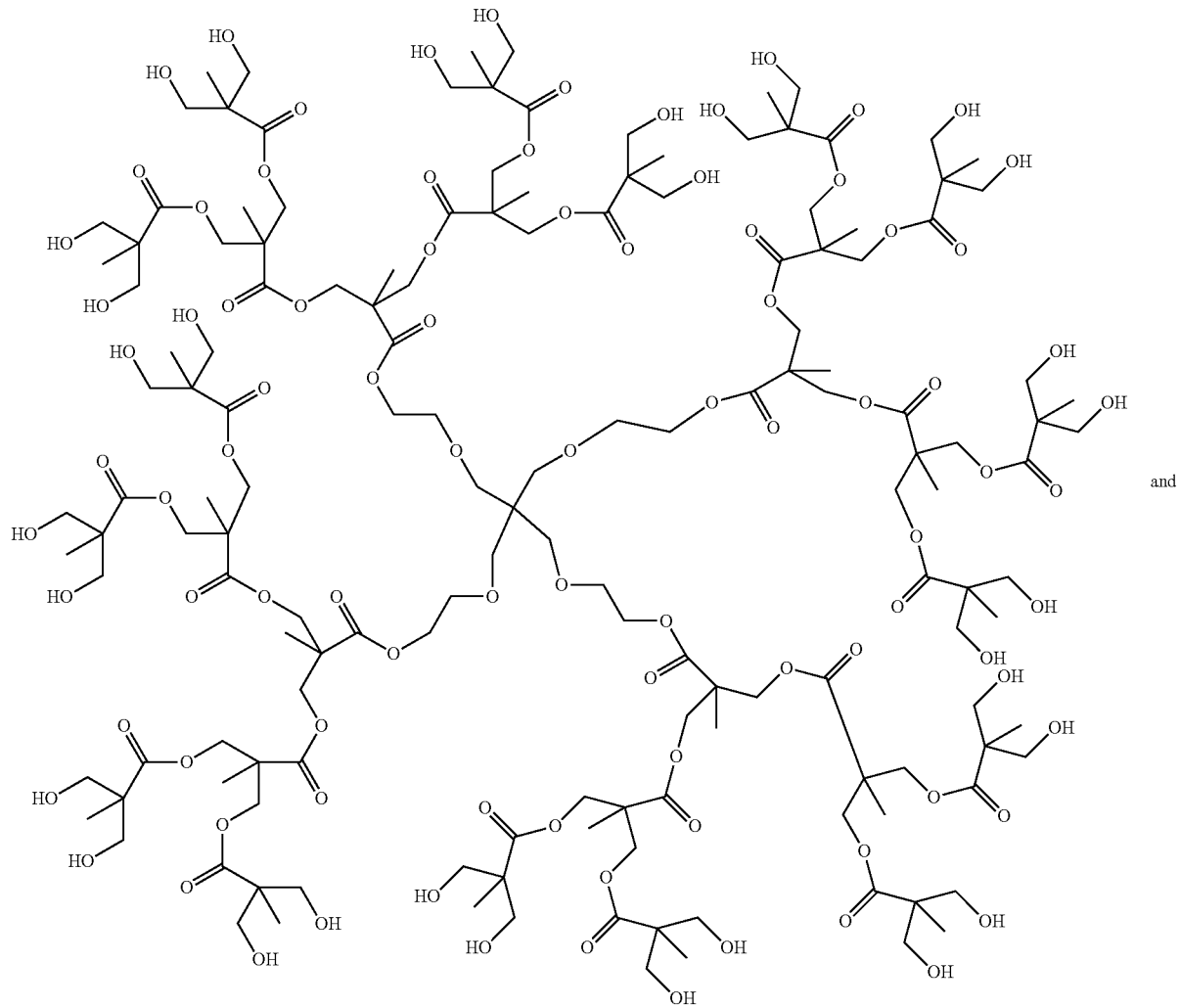
and

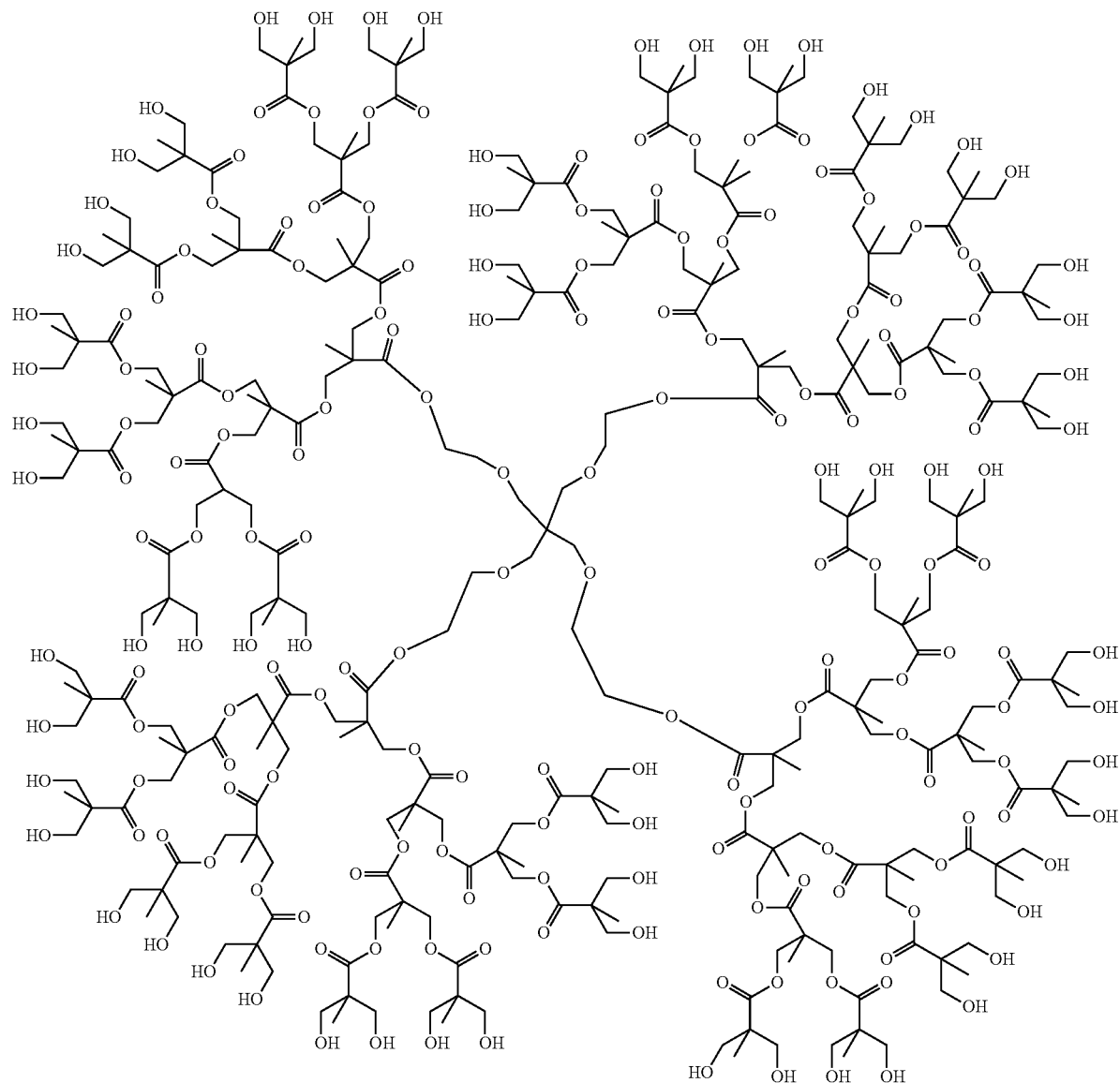

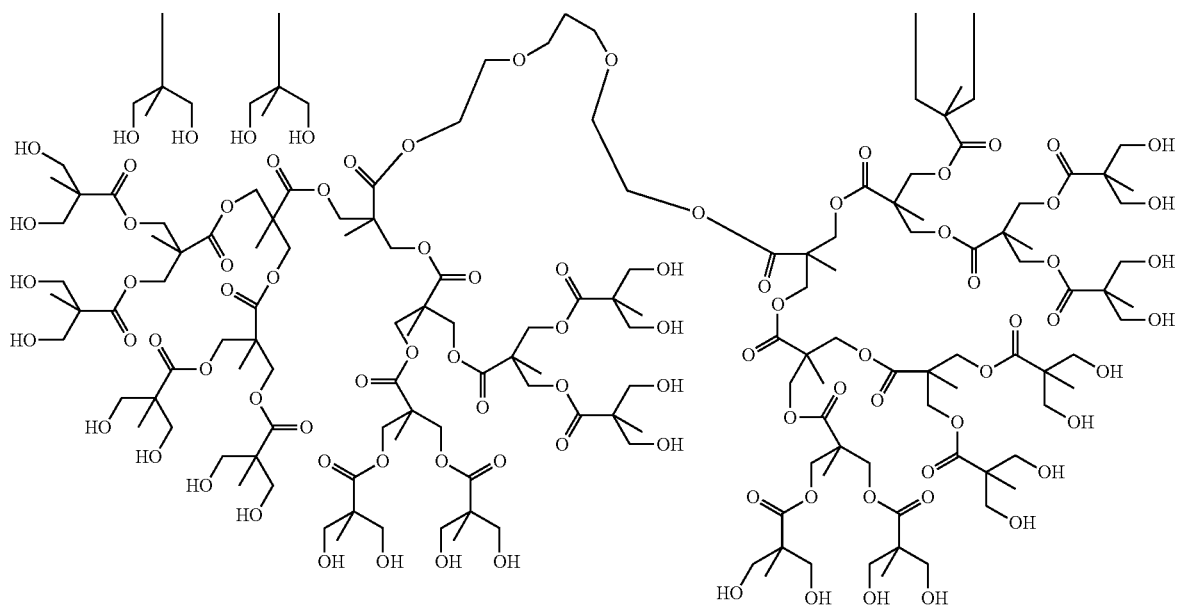

In the above-mentioned preparation methods, the super-branched polyester may preferably be obtained by esterification reactions of the aliphatic super-branched polyester with acrylic acid and naphthylacetic acid. Wherein, the ratio of the additive amount of naphthylacetic acid relative to the total additive amount of acrylic acid and naphthylacetic acid may be preferably 30-80% by mole, and more preferably, 40-75% by mole.

The raw materials of the esterification reaction may preferably comprise water-carrying agent, polymerization inhibitor and catalyst.

Nitrogen gas is preferably inlet for protection to the esterification reaction.

More preferably, toluene is used as the water-carrying agent in the esterification reaction. Under the condition of using toluene as the water-carrying agent, the preferable reaction temperature may be 110-130° C., and more preferably 115-120° C.; the preferable reaction time may be 4-12 hours, and more preferably 5-10 hours.

More preferably, 4-methoxyphenol is used as the polymerization inhibitor for the esterification reaction. The mole ratio of the polymerization inhibitor used relative to (meth)acrylic acid or (meth)acryloyl chloride is preferably 0.5-8.0% by mole, and more preferably 2.0-6.0% by mole.

More preferably, p-toluenesulfonic acid is used as the catalyst for the esterification reaction. The mole ratio of the catalyst amount relative to the total moles of the following compounds is 1.0% by mole to 15.0% by mole, and more preferably 3.0% by mole to 10.0% by mole: at least one compound selected from (meth)acrylic acid and (meth)acryloyl halide; and at least one compound selected from naphthylacetic acid and naphthylacetyl halide.

More preferably, the preparation method also comprises conducting the following separation of the products obtained from the esterification reaction: using $NaHCO_3$ aqueous solution, diluted hydrochloric acid and saturated salt water to wash the products in batches, and then obtaining the organic layer as remained; drying and dehydrating the organic layer; and then removing the solvent with reduced pressure, thereby obtaining the crosslinkable curing super-branched polyester.

When curing the above-mentioned curable monomer, due to the existence of (meth)acryloyloxyls as terminal groups in the monomer, photocuring methods can be used for free radical curing. Thus, the present invention also provides a crosslinkable curing super-branched polyester composition, which comprises the above-mentioned crosslinkable curing super-branched polyester and optionally a photoinitiator. As for the photoinitiator, such common initiators as 2-hydroxyl-2methyl-1-phenyl-1-propanone (Darocur 1173), 1-hydroxy-cyclohexyphenyl-ketone (Irgacure 184), 2-benzyl-2(dimethylamino)-1-[4-(4-morpholinyl) phenyl]-1-butanone (Irgacure 369), alpha, alpha-dimethoxy-alpha-phenylacetophenone (Irgacure 651), phenyl bis (2,4,6-trimethylbenzoyl) phosphine oxide (Irgacure 819), 2-methyl-1-[4-(methylthio)phenyl]-2-(4-morpholnyl)-1-propanone (Irgacure 907), 2-hydroxy-1-[4-(2-hydroxyethoxy)phenyl]-2-methyl-1-propanone (Irgacure 2959) and TPO (2,4,6-trimethylbenzolyldiphenyl phospine oxide) (all of which can be purchased from Ciba company) can be used preferable. The account of the photoinitiator used is not limited particularly, and can be determined properly according to the actual situation. For example, for Darocur 1173, its amount relative to the weight of the composition can be 0.5-5 wt. %, and more preferably 1-3 wt. %. In addition, other well-known photoinitiators applicable to the crosslinking reaction of (meth)acryloyloxyl may also be used.

In addition to the above-mentioned crosslinkable curing super-branched polyester and optional photoinitiator, the composition may also comprise such common additives as solvent, levelling agent and anti-grinding agent, and other optional free radical polymerization monomers, such as (meth)acrylic acid (ester), etc.

In the photocuring reaction, common equipments like ultraviolet lamp (e.g. medium or high pressure mercury lamp) or electron beam, etc., or visible light can be selected according to the used initiator to radiate the above-mentioned composition, thereby initiating the reaction. Therefore, the curing reaction is very simple, easy to implement, and can be applied to the majority of situations where brightness enhancement and protection are needed.

On the other hand, the super-branched polyester of the present invention can also form the cured products with high refractive index by a thermocuring reaction. As regards the thermocuring reaction of (meth)acryloyloxyl, those skilled in the art know how to choose appropriate temperature and time for the reaction, which will not be described in detail herein.

EXAMPLES

Further detailed explanations will be given to the method for synthesizing the crosslinkable curing super-branched polyester according to the present invention by the following examples, wherein all the ratio/percentages of the raw materials refer to the ratio by weight.

Example 1

In this example, the super-branched polyester Boltorn H30, Reproductive Generation Number 3, was used as one of the starting materials, and the synthetic process was as follows: adding 4.1 g acrylic acid, 16.0 g naphthylacetic acid and 16.11 g super-branched polyester Boltron H30 into a three-necked flask equipped with reflux condensing tube, a water segregator and a stirring head, and adding an appropriate amount of toluene as the water-carrying agent, 0.289 g 4-methoxyphenol (MEHQ) as the polymerization inhibitor, and 1.27 g of p-methyl benzene sulfonic acid as the catalyst. The reaction temperature was 118° C.-120° C.; nitrogen was introduced for protection. The reaction lasted for about 8 hours, until the infrared detector detected that the absorption peak of hydroxyl at 3408 cm' had stopped changing (or until the acid value of the reaction system had stopped decreasing). The reaction system was cooled to room temperature, diluted with dichloromethane, and then successively washed with 10% $NaHCO_3$, 0.1 mol/L diluted hydrochloric acid and saturated salt water, collecting the organic layer as remained. The organic layer is dried and dehydrated by using anhydrous $MgSO_4$, and the solvent was removed by reducing pressure, yielding a product of light yellow, viscous liquid, denoted as HBNA3C. Its $^1$HNMR spectrum confirmed the successful synthesis of the product (see FIG. 1), and it was calculated from the area of the relevant chemical shift peaks that the esterification rate was 86%; namely 86% hydroxyl-terminated groups in Boltron H30 involved in the esterification reaction. The refractive index of the obtained product was 1.563.2% photoinitiator Darocur 1173 was added in the product, which was then filmed and then cured under irradiation of a 400 W medium pressure mercury lamp, thereby obtaining a cured film having a refractive index of 1.578.

Comparative Example 1 for the purpose of comparison, in this comparative example, naphthylacetic acid that can increase the refractive index was not added, and instead, only acrylic acid was used to modify the super-branched polyester. The synthetic process was the same as that of Example 1, except that the additive amount of acrylic acid was 10.3 g, the additive amount of naphthylactic acid was 0, the amount of p-toluene-sulfonic acid was 0.92 g, and the amount of the polymerization inhibitor MEHQ was 0.21 g. The amounts of the rest of materials used were the same as those in Example 1. The product obtained was a light yellow, viscous liquid, denoted as HBNA3A. Its $^1$HNMR spectrum confirmed the successful synthesis of the product (see FIG. 1), and it was calculated from the area of the relevant chemical shift peaks that the esterification rate was 85%. The refractive index of the product was 1.475.2% photoinitiator Darocur 1173 was added to the product, which was filmed and then cured under irradiation of a 400 W medium pressure mercury lamp, thereby obtaining a cured film having a refractive index of 1.502.

Comparative Example 2 in this comparative example, for the purpose of comparison, acrylic acid that provides curable groups was not added, while instead, only naphthylacetic acid was used to modify the super-branched polyester. The synthetic process was the same as that of Example 1, except that the additive amount of acrylic acid was 0, the additive amount of naphthylactic acid was 26.6 g, the amount of p-toluenesulfonic acid was 1.49 g, the amount of the polymerization inhibitor MEHQ was 0, but the amounts of the rest of materials used were the same as those in Example 1. The product obtained was a light yellow, viscous liquid, denoted as HBNA3E. Its $^1$H NMR spectrum confirmed the successful synthesis of the product (see FIG. 1), and it was calculated from the area of the relevant chemical shift peaks that the esterification rate was 89%. The refractive index of the product was 1.593. Since the product did not comprise groups for free radical curing, it could not be cured to form film under the action of free radical photoinitiator and irradiation, and could only be used as a non-curing high refractive index resin.

Example 2

In this example, the super-branched polyester Boltorn H20, Reproductive Generation Number 2, was used as one of the starting materials, and the synthetic process was the same as that of Example 1, except that the usage amounts of Boltorn H20, p-toluenesulfonic acid and polymerization inhibitor MEHQ were 15.65 g, 1.25 g and 0.29 g, respectively, with the usage amounts of the other materials being the same as those in Example 1. The product was a light yellow, viscous liquid, denoted as HBNA2C. Its $^1$H NMR spectrum confirmed the successful synthesis of the product, and it was calculated from the area of the relevant chemical shift peak that the esterification rate was 87%. The refractive index of the product was 1.562.2% photoinitiator Darocur 1173 was added to the product, which was then filmed and cured under irradiation of a 400 W medium pressure mercury lamp, thereby obtaining a cured film having a refractive index of 1.578.

Example 3

In this example, the super-branched polyester Boltorn H40, Reproductive Generation Number 4, was used as one of the starting materials, and the synthetic process was the same as that of Example 1, except that the usage amounts of Boltorn H40, p-toluenesulfonic acid and polymerization inhibitor MEHQ were 16.52 g, 1.28 g and 0.29 g, respectively, with the usage amounts of the other materials being the same as those in Example 1. The product was a light yellow, viscous liquid, denoted as HBNA4C. Its $^1$H NMR spectrum confirmed the successful synthesis of the product, and it was calculated from the area of the relevant chemical shift peaks that the esterification rate was 85%. The refractive index of the product was 1.560.2% photoinitiator Darocur 1173 was added to the product, which was then filmed and cured under irradiation of a 400 W medium pressure mercury lamp, thereby obtaining a cured film having a refractive index of 1.576.

From Examples 1, 2 and 3, it can be seen that in the cases of using super-branched polyester of different Reproductive Generation Numbers for modification, when the ratios of the modifying compounds (acrylic acid and naphthylacetic acid) are fixed to the same, the different products will have refractive indices similar to each other.

Example 4

In comparison with Example 1, the ratio of the amounts of acrylic acid and naphthylacetic acid in this example was changed, while the synthetic process was the same as that of Example 1, except that the additive amount of acrylic acid was 6.23 g, the additive amount of naphthylacetic acid was 10.7 g, the amount of p-toluenesulfonic acid was 1.15 g, and the amount of the polymerization inhibitor MEHQ was 0.27 g, with the amounts of the rest of materials used being the same as those in Example 1. The resultant product was a light yellow, viscous liquid, denoted as HBNA3B. Its $^1$H NMR spectrum confirmed the successful synthesis of the product, and it was calculated from the area of the relevant chemical shift peaks that the esterification rate was 88%. The refractive index of the product was 1.543. 2% photoinitiator Darocur 1173 was added to the product, which was then filmed and cured under irradiation of a 400 W medium pressure mercury lamp, thereby obtaining a cured film having a refractive index of 1.562.

Example 5

In comparison with Example 1, the ratio of the amounts of acrylic acid and naphthylacetic acid in this example was changed, while the synthetic process was the same as that of Example 1, except that the additive amount of acrylic acid was 2.6 g, the additive amount of naphthylacetic acid was 20.0 g, the amount of p-toluenesulfonic acid was 1.35 g, and the amount of the polymerization inhibitor MEHQ was 0.31 g, with the amounts of the rest of materials used being the same as those in Example 1. The product obtained was a light yellow, viscous liquid, denoted as HBNA3D. Its $^1$H NMR spectrum confirmed the successful synthesis of the product, and it was calculated from the area of the relevant chemical shift peaks that the esterification rate was 87%. The refractive index of the product was 1.577.2% photoinitiator Darocur 1173 was added to the product, which was then filmed and cured under irradiation of a 400 W medium pressure mercury lamp, thereby obtaining a cured film having a refractive index of 1.592.

From Examples 1, 4 and 5, it can be seen that in the synthesis of the curable super-branched polyester according to the present invention, the refractive index of the product can be adjusted conveniently by changing the ratio of the additive amounts of acrylic acid and naphthylacetic acid.

TABLE 1

Comparison of Examples with Comparative Examples

| No. | Backbone Compound | Additive amount of Naphthalene Rings: Total Additive amount (% by mole) * | Esterification Ratio | Monomer Refractive Index | Refractive Index of Cured Product |
|---|---|---|---|---|---|
| Example 1 | Boltorn H30 | 60 | 86% | 1.563 | 1.578 |
| Example 2 | Boltorn H20 | 60 | 87% | 1.562 | 1.578 |

TABLE 1-continued

Comparison of Examples with Comparative Examples

| No. | Backbone Compound | Additive amount of Naphthalene Rings: Total Additive amount (% by mole) * | Esterification Ratio | Monomer Refractive Index | Refractive Index of Cured Product |
|---|---|---|---|---|---|
| Example 3 | Boltorn H40 | 60 | 85% | 1.560 | 1.576 |
| Example 4 | Boltorn H30 | 40 | 88% | 1.543 | 1.562 |
| Example 5 | Boltorn H30 | 75 | 87% | 1.577 | 1.592 |
| Comparative Ex. 1 | Boltorn H30 | 0 | 85% | 1.475 | 1.502 |
| Comparative Ex. 2 | Boltorn H30 | 100 | 89% | 1.593 | N/A |

* Note:
The total additive amount is the sum of the additive amount of naphthalene rings and the additive amount of (meth)acryloyloxyl.

What is claimed:

1. A crosslinkable curing super-branched polyester, comprising a compound represented by formula (I):

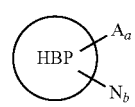

wherein HBP is the skeleton of the super-branched polyester; both a and b are positive integers; the sum of a and b is less than or equal to n; and n is greater than or equal to 10 but less than 80;

A is represented by formula (II):

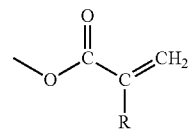

wherein R is methyl or hydrogen atom;
N is represented by formula (III):

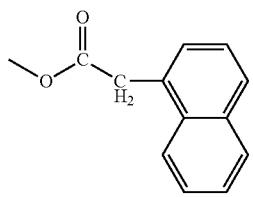

wherein the mole ratio of N relative to the total moles of A and N is greater than or equal to 30% by mole, and the ratio of the total moles of A and N relative to the total moles of HBP skeleton multiplied by n is greater than or equal to 0.5 but less than or equal to 1; wherein the super-branched polyester skeleton is derived from an aliphatic super-branched polyester having n hydroxyl-terminated groups.

2. The super-branched polyester of claim 1, wherein the aliphatic super-branched polyester is one or more compound(s) selected from the following compounds:

25
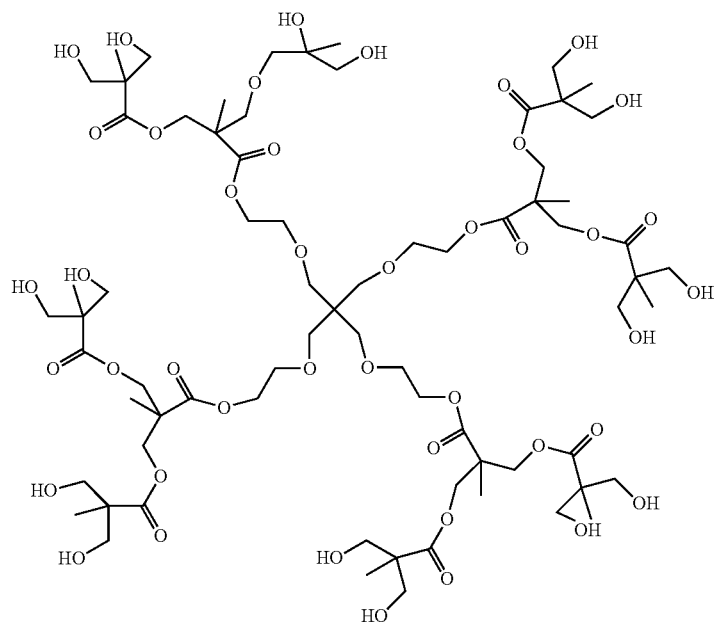 [SMILES: CC(O)(CO)COCC(C)(COC(=O)C1(CO)CO1)C(=O)OCCOCC(COCCOC(=O)C(C)(COC(=O)C(C)(CO)CO)COC(=O)C(C)(CO)CO)(COCCOC(=O)C(C)(COC(=O)C(C)(CO)CO)COC(=O)C1(CO)CO1)COCCOC(=O)C(C)(COC(=O)C(C)(CO)CO)COC(=O)C1(CO)CO1]
26
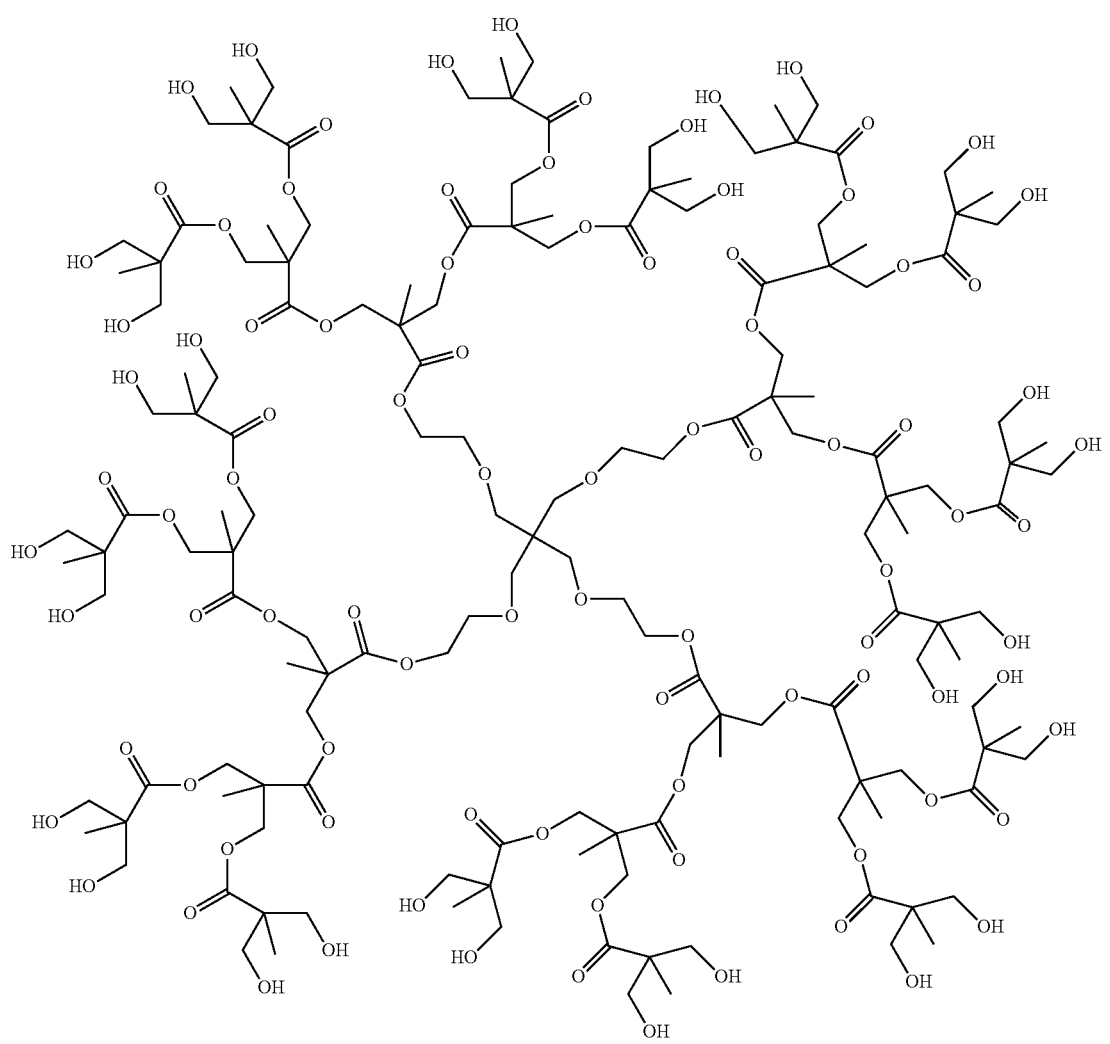
and

-continued

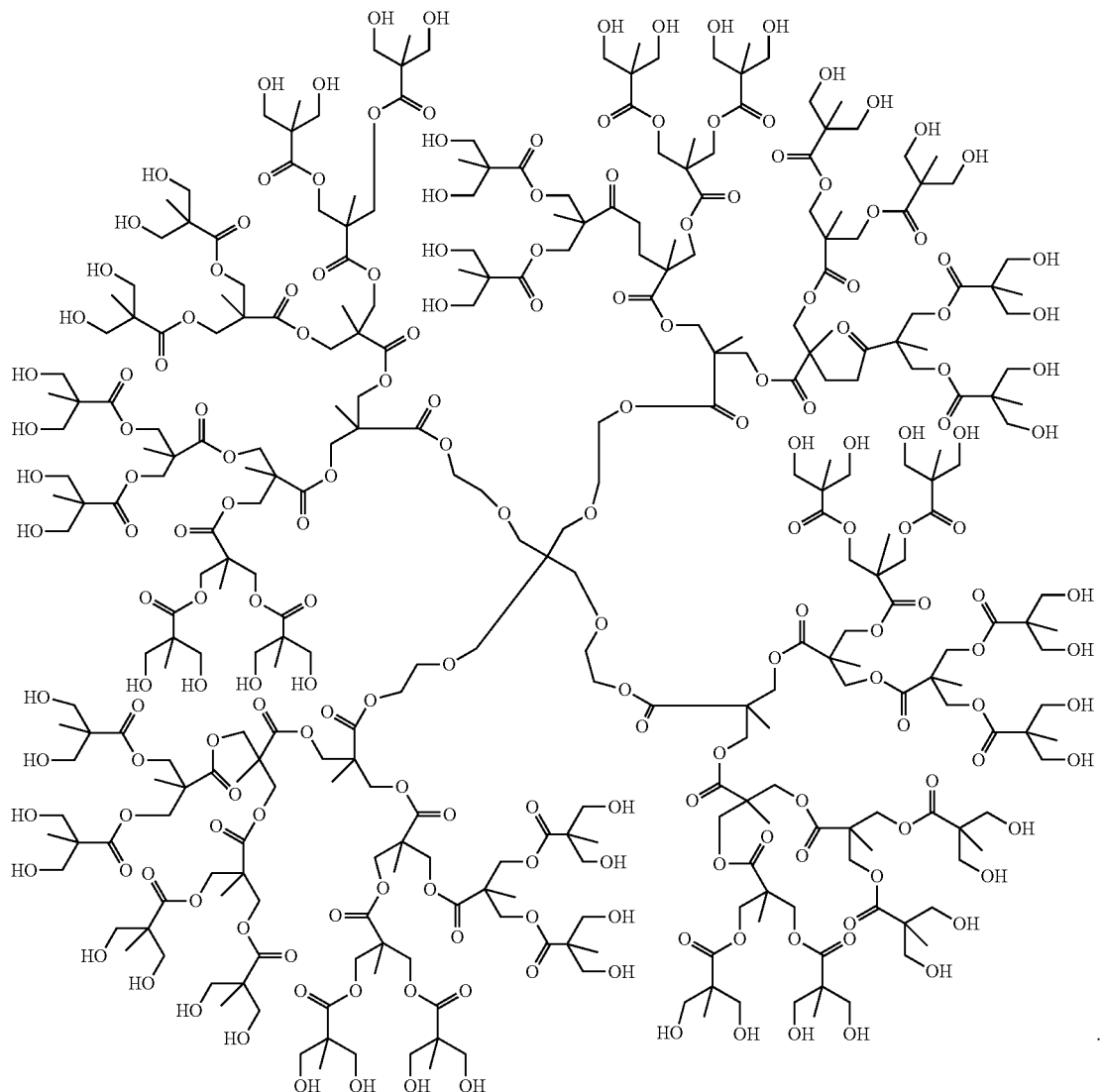

3. The super-branched polyester of claim 1, wherein the ratio of the total moles of A and N relative to the total moles of HBP skeletons multiplied by n is greater than or equal to 0.6.

4. The super-branched polyester of claim 1, wherein the ratio of the total moles of A and N relative to the total moles of HBP skeletons multiplied by n is greater than or equal to 0.7.

5. The super-branched polyester of claim 1, wherein the ratio of the mole of N relative to the total moles of A and N is greater than or equal to 40% by mole, but less than 90% by mole.

6. The super-branched polyester of claim 5, wherein the ratio of the mole of N relative to the total moles of A and N is less than or equal to 80% by mole.

7. The super-branched polyester of claim 5, wherein the ratio of the mole of N relative to the total moles of A and N is greater than or equal to 40% by mole, but less than or equal to 75% by mole.

8. The super-branched polyester of claim 7, wherein the refractive index of the super-branched polyester is 1.50-1.60.

9. The super-branched polyester of claim 5, wherein the sum of a and b is greater than or equal to 0.6 n but less than or equal to n.

10. A method for preparing the crosslinkable curing super-branched polyester of claim 1, wherein the super-branched polyester is obtained from reaction of a super-branched polyester skeleton compound having n hydroxyl-terminated groups with the following compounds: at least one compound selected from (meth)acrylic acid and (meth)acryloyl halide; and at least one compound selected from naphthylacetic acid and naphthylacetyl halide; wherein the super-branched polyester skeleton compound having n hydroxyl-terminated groups is an aliphatic super-branched polyester.

11. The method of claim 10, wherein the aliphatic super-branched polyester is one or more compound(s) selected from the following compounds:

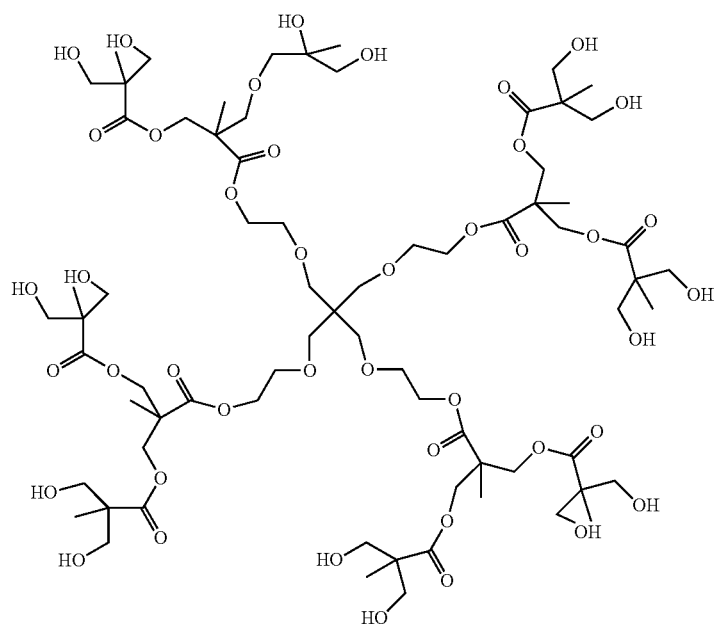 [SMILES: CC(O)(CO)COCC(C)(COC(=O)C1(CO)CO1)C(=O)OCCOCC(COCCOC(=O)C(C)(COC(=O)C(C)(CO)CO)COC(=O)C(C)(CO)CO)(COCCOC(=O)C(C)(COC(=O)C(C)(CO)CO)COC(=O)C1(CO)CO1)COCCOC(=O)C(C)(COC(=O)C(C)(CO)CO)COC(=O)C1(CO)CO1]
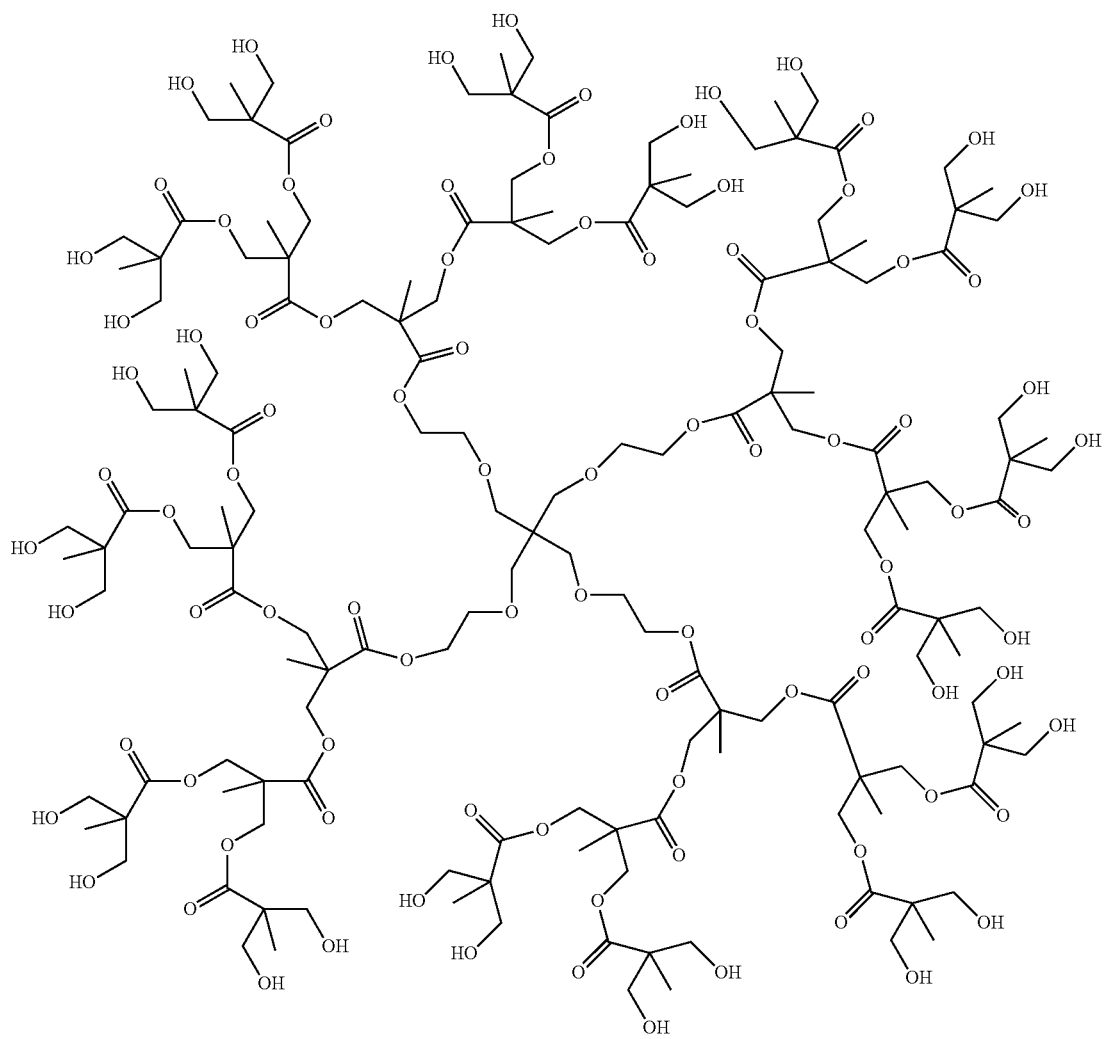
and

-continued

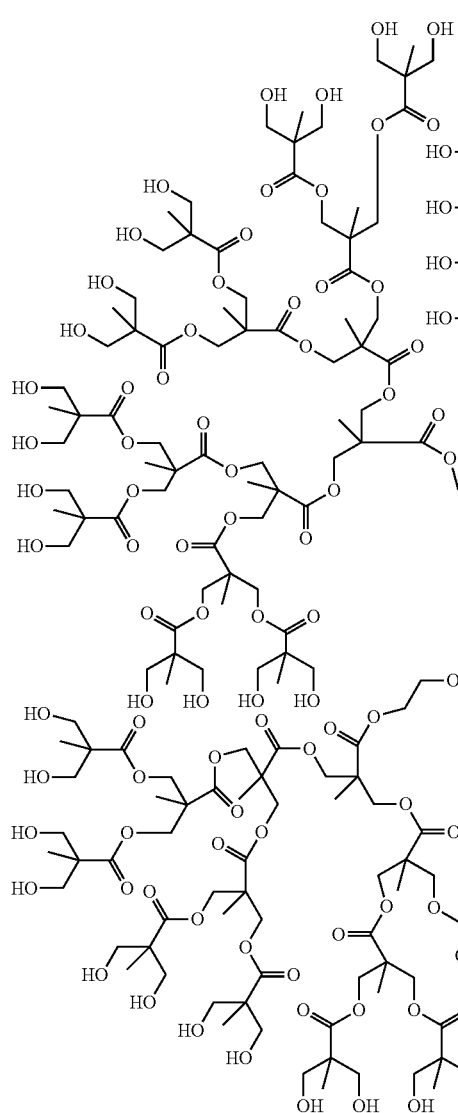
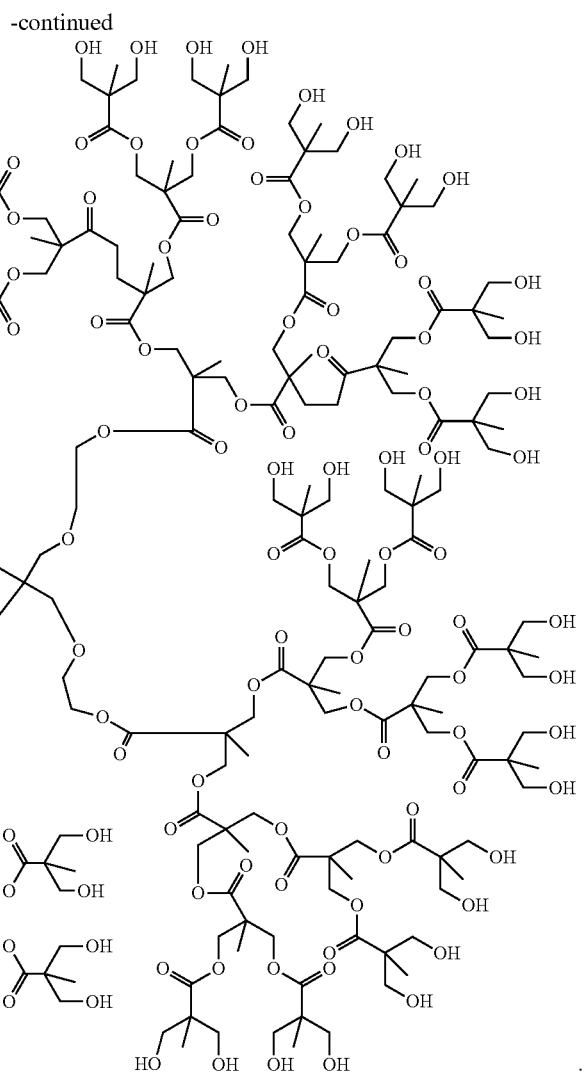

12. The method of claim 10, wherein the super-branched polyester is obtained from esterification reaction of the aliphatic super-branched polyester with acrylic acid and naphthylacetic acid.

13. The method of claim 12, wherein the ratio of the additive amount of naphthylacetic acid relative to the total additive amount of acrylic acid and naphthylacetic acid is 30-80% by mole.

14. The method of claim 12, wherein the ratio of the additive amount of naphthylacetic acid relative to the total additive amount of acrylic acid and naphthylacetic acid is 40-75% by mole.

15. A crosslinkable curing super-branched polyester composition, wherein the composition comprises the super-branched polyester of claim 1 and a photoinitiator.

16. The composition of claim 15, wherein the photoinitiator is 0.5-5wt. % of the composition.

17. The composition of claim 15, wherein the photoinitiator is 1-3wt. % of the composition.

18. The composition of claim 15, wherein the photoinitiator is one or more initiator(s) selected from 2-hydroxy-2-methyl-1-phenyl-1-propanone 1-hydroxy-cyclohexyphenyl-ketone, 2-benzyl-2-(dimethylamino)-1-[4-(4-morpholinyl)phenyl]-1-butanone, alpha,alpha-dimethoxy-alpha-phenylacetophenone, phenyl bis(2,4,6-trimethylbenzoyl)phosphine oxide, 2-methyl-1-[4-(methylthio)phenyl]-2-(4-morpholnyl)-1-propanone, 2-hydroxy-1-[4-(2-hydroxy-ethoxy)phenyl]-2-methyl-1-propanone and 2,4,6-trimethyl-benzoyldiphenyl phosphine oxide.

19. A cured product, which is obtained from a curing reaction of the composition of claim 15.

20. The cured product of claim 19, wherein the refractive index of the cured product is 1.55-1.65.

21. The cured product of claim 19, wherein the curing reaction is a photocuring reaction conducted by using an ultraviolet lamp, electron beam or visible light to irradiate the composition.

* * * * *